US010596898B2

(12) United States Patent
Herwat et al.

(10) Patent No.: US 10,596,898 B2
(45) Date of Patent: Mar. 24, 2020

(54) MUFFLER ASSEMBLY INCLUDING A CENTER MUFFLER AND TWO SATELLITE MUFFLERS

(71) Applicant: Tenneco Automotive Operating Company Inc., Lake Forest, IL (US)

(72) Inventors: Brett Herwat, Jackson, MI (US); Keith Bartu, Dexter, MI (US); Gabriel Ostromecki, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 32 days.

(21) Appl. No.: 15/972,686

(22) Filed: May 7, 2018

(65) Prior Publication Data

US 2019/0337377 A1 Nov. 7, 2019

(51) Int. Cl.
*F01N 13/02* (2010.01)
*B60K 13/04* (2006.01)
(Continued)

(52) U.S. Cl.
CPC .............. *B60K 13/04* (2013.01); *F01N 1/023* (2013.01); *F01N 3/021* (2013.01); *F01N 13/011* (2014.06);
(Continued)

(58) Field of Classification Search
CPC ...... F01N 1/089; F01N 13/009; F01N 13/011; F01N 13/02; F01N 2490/02;
(Continued)

(56) References Cited

U.S. PATENT DOCUMENTS 5,014,817 A * 5/1991 Takato .................... F01N 1/166
181/239
5,321,214 A 6/1994 Uegane et al.
(Continued)

FOREIGN PATENT DOCUMENTS

DE 4116493 A1 * 11/1992 ............... F01N 3/28
EP 3118429 A1 * 1/2017 ............. F01N 13/02
KR 20090063494 A 6/2009

OTHER PUBLICATIONS

Machine translation of DE-4116493-A1, accessed on Aug. 3, 2019. (Year: 2019).*

*Primary Examiner* — Jonathan R Matthias
(74) *Attorney, Agent, or Firm* — Harness, Dickey & Pierce, P.L.C.

(57) ABSTRACT

An exhaust assembly includes first and second exhaust devices, and first, second, and third mufflers that are disposed at first, second, third, fourth, and fifth heights, respectively. The first and second heights are greater than the third, fourth, and fifth heights. The first muffler includes a first housing, first and second inlets, and first and second outlets. The first inlet receives exhaust gas from at least one of the first and second exhaust devices. The second inlet receives exhaust gas from at least one of the first and second exhaust devices. The first and second inlets and first and second outlets all fluidly connected. The second muffler includes a second housing, a third inlet that receives exhaust gas from the first outlet, and a third outlet. The third muffler includes a third housing, a fourth inlet that receives exhaust gas from the second outlet, and a fourth outlet.

18 Claims, 5 Drawing Sheets

(51) Int. Cl.
*F01N 1/02* (2006.01)
*F01N 13/00* (2010.01)
*F01N 13/04* (2010.01)
*F01N 3/021* (2006.01)
*F01N 13/08* (2010.01)

(52) U.S. Cl.
CPC ............ *F01N 13/02* (2013.01); *F01N 13/04* (2013.01); *F01N 13/082* (2013.01); F01N 2470/14 (2013.01); F01N 2470/16 (2013.01); F01N 2490/02 (2013.01); F01N 2490/10 (2013.01); F01N 2490/155 (2013.01)

(58) Field of Classification Search
CPC ............ F01N 2490/04; F01N 2490/10; F01N 2490/15; F01N 2490/155
See application file for complete search history.

(56) References Cited

U.S. PATENT DOCUMENTS

| | | | |
|---|---|---|---|
| 5,325,666 A * | 7/1994 | Rutschmann | ............ F01N 3/28 123/692 |
| 5,388,408 A | 2/1995 | Lawrence | |
| 5,473,891 A | 12/1995 | Baxter et al. | |
| 7,895,832 B2 | 3/2011 | Gruber | |
| 7,942,235 B2 | 5/2011 | Mirlach et al. | |
| 8,468,813 B2 | 6/2013 | Hill et al. | |
| 9,109,482 B2 | 8/2015 | Fritz et al. | |
| 9,261,009 B2 | 2/2016 | Hamashima et al. | |
| 9,341,102 B2 | 5/2016 | Ross et al. | |
| 9,453,452 B2 | 9/2016 | Kondo et al. | |
| 9,464,557 B2 | 10/2016 | Hornby et al. | |
| 9,605,580 B2 | 3/2017 | Drees et al. | |
| 9,689,301 B2 | 6/2017 | Carr et al. | |
| 2011/0000186 A1* | 1/2011 | Laube | ....................... F01N 1/00 60/272 |
| 2013/0008737 A1* | 1/2013 | Muller | .................... F01N 13/02 181/229 |
| 2016/0024989 A1* | 1/2016 | Eichmueller | ........... F01N 13/02 60/273 |
| 2016/0053658 A1* | 2/2016 | Drees | ....................... F01N 13/02 60/273 |
| 2018/0202344 A1* | 7/2018 | Klemenc | ................ F01N 13/02 |
| 2018/0320646 A1* | 11/2018 | Naclerio | ................ F01N 1/023 |

* cited by examiner

MUFFLER ASSEMBLY INCLUDING A CENTER MUFFLER AND TWO SATELLITE MUFFLERS

FIELD

The present disclosure relates to a muffler assembly for an exhaust system of an internal combustion engine, and more particularly to a muffler assembly including a central muffler and two satellite mufflers having distinct housings.

BACKGROUND

This section provides background information related to the present disclosure which is not necessarily prior art.

An internal combustion engine can generate a substantial amount of combustion noise, which is transferred through an exhaust system and is audible as tailpipe noise. Mufflers are used within exhaust systems to reduce this noise and/or tune the exhaust sound characteristics so that the tailpipe noise has desired sound qualities. Tradeoffs between packaging space, flow performance, and sound characteristics are often made in the design of a muffler. The present disclosure provides a muffler that fits within limited space on a vehicle while providing a desired level of performance and desired sound characteristics.

SUMMARY

This section provides a general summary of the disclosure, and is not a comprehensive disclosure of its full scope or all of its features.

In one aspect, the present disclosure provides an exhaust assembly for receiving exhaust gas from an engine of a vehicle that is adapted to travel along a surface. The exhaust assembly includes a first exhaust device, a second exhaust device, a first muffler, a second muffler, and a third muffler. The first exhaust device is disposed at a first height with respect to the surface. The first exhaust device is adapted to receive exhaust gas from the engine. The second exhaust device is disposed at a second height with respect to the surface. The second exhaust device is adapted to receive exhaust gas from the engine. The first muffler is disposed at a third height relative to the surface. The first muffler includes a first housing, a first inlet, a second inlet, a first outlet, and a second outlet. The first inlet is adapted to receive exhaust gas from at least one of the first and second exhaust devices. The second inlet is adapted to receive exhaust gas from at least one of the first and second exhaust devices. The first and second inlets and the first and second outlets are fluidly connected to one another. The second muffler is disposed at a fourth height relative to the surface. The second muffler includes a second housing, a third inlet, and a third outlet. The third inlet is adapted to receive exhaust gas from the first outlet. The third muffler is disposed at a fifth height relative to the surface. The third muffler includes a third housing, a fourth inlet, and a fourth outlet. The fourth inlet is adapted to receive exhaust gas from the second outlet. The first and second heights are greater than the third, fourth, and fifth heights.

In another aspect, the present disclosure provides an exhaust assembly for receiving exhaust gas from an engine of a vehicle that is adapted to travel along a surface. The exhaust assembly includes a first exhaust device, a second exhaust device, a first muffler, a second muffler, and a third muffler. The first exhaust device is adapted to receive exhaust gas from the engine. The second exhaust device is adapted to receive exhaust gas from the engine. The first muffler includes an X-pipe having a first inlet, a second inlet, a first outlet, and a second outlet. The first inlet is adapted to receive exhaust gas from the first exhaust device. The second inlet is adapted to receive exhaust gas from the second exhaust device. The first and second inlets and the first and second outlets are fluidly connected to one another. The second muffler includes a second housing, a third inlet, and a third outlet. The third inlet is adapted to receive exhaust gas from the first outlet. The third muffler includes a third housing, a fourth inlet, and a fourth outlet. The fourth inlet is adapted to receive exhaust gas from the second outlet. The first and second exhaust devices are disposed laterally outboard of the first muffler and on opposing sides of the first muffler.

In yet another aspect, the present disclosure provides an exhaust assembly for receiving exhaust gas from an engine of a vehicle that is adapted to travel along a surface. The exhaust assembly includes a first exhaust device, a second exhaust device, a first muffler, a second muffler, and a third muffler. The first exhaust device is adapted to receive exhaust gas from the engine. The second exhaust device is adapted to receive exhaust gas from the engine. The first muffler has a first inlet, a second inlet, a first outlet, and a second outlet. The first inlet is adapted to receive exhaust gas from the first exhaust device. The second inlet is adapted to receive exhaust gas from the second exhaust device. The first and second inlets and the first and second outlets are fluidly connected to one another. The first and second inlets and the first and second outlets at least partially define a center plane. The center plane extends perpendicular to a longitudinal axis of the vehicle. The second muffler includes a second housing, a third inlet, and a third outlet. The third inlet is adapted to receive exhaust gas from the first outlet. The third muffler includes a third housing, a fourth inlet, and a fourth outlet. The fourth inlet is adapted to receive exhaust gas from the second outlet. The first and second exhaust devices are disposed forward of the center plane with respect to the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2B show an X-pipe of the central muffler of FIG. 1.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
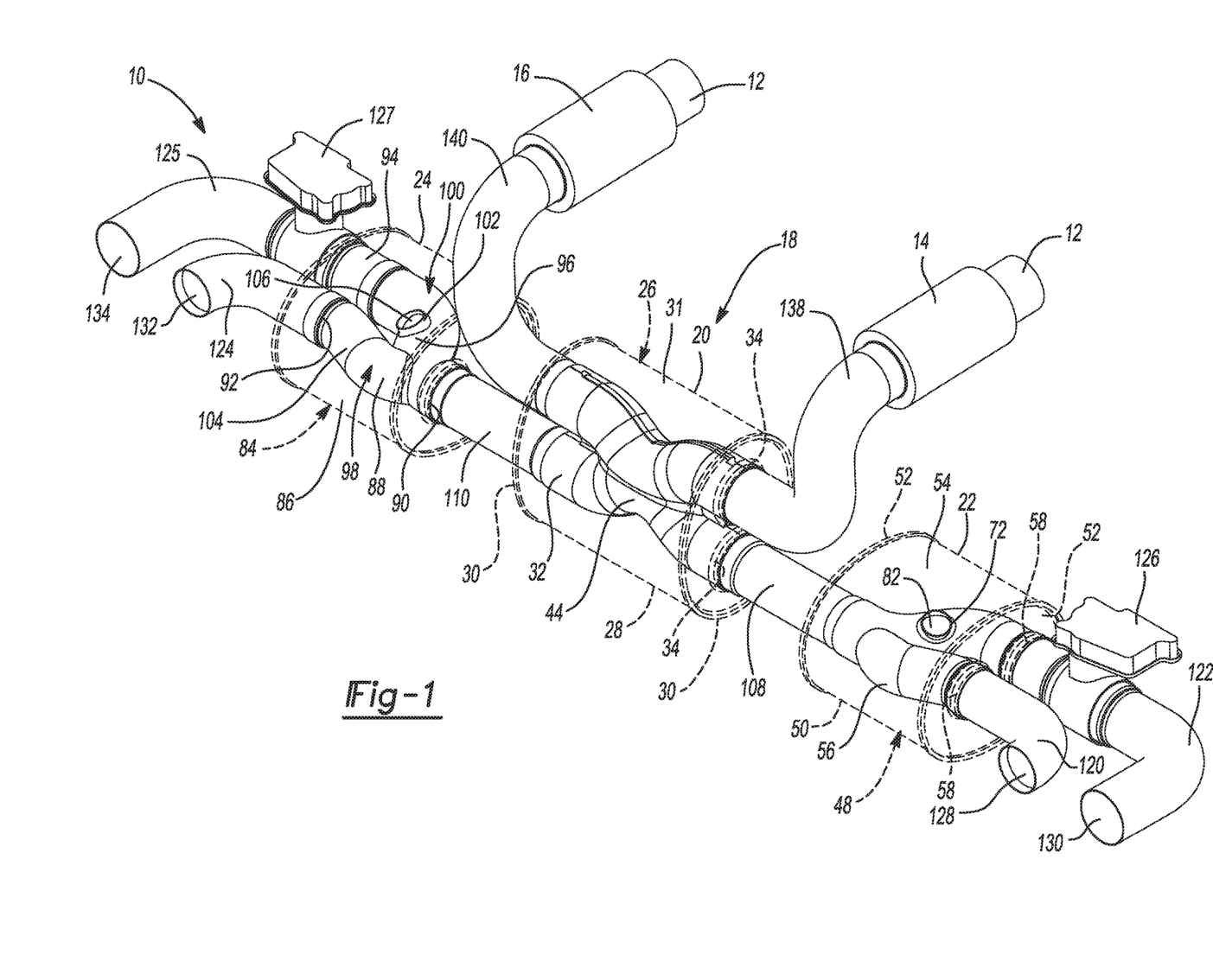
FIG. 1 is a perspective view of an exhaust assembly including a muffler assembly having a central muffler and two satellite mufflers according to the principles of the present disclosure.
Figure 2A:
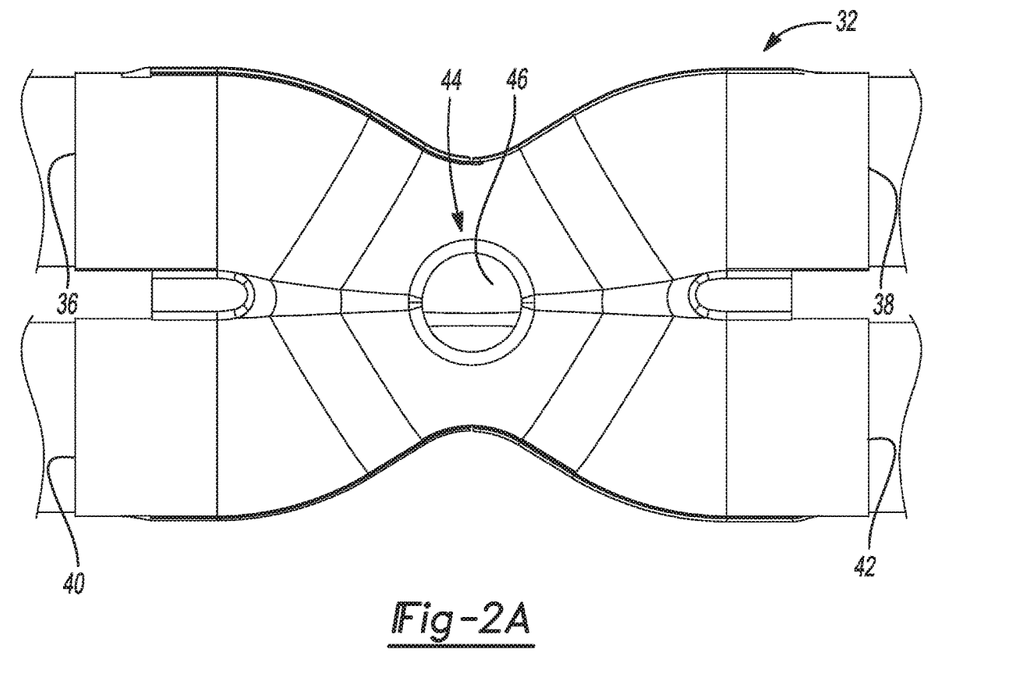
FIG. 2A is a front view.
Figure 2B:
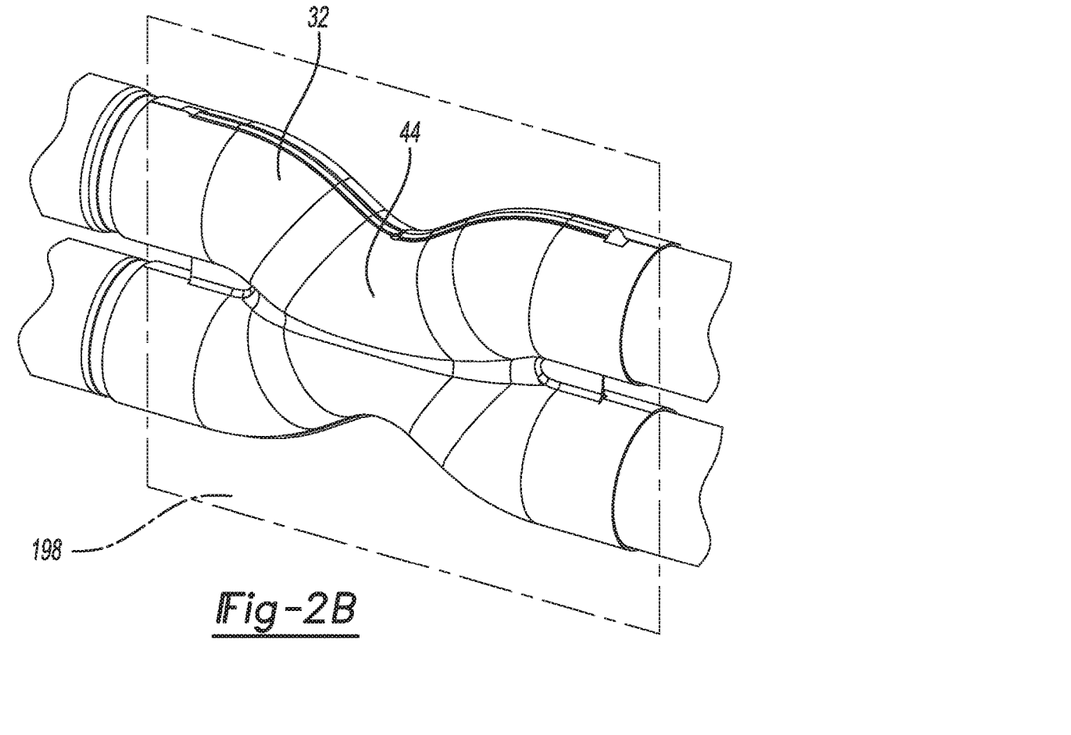
FIG. 2B is a perspective view.
Figure 3:
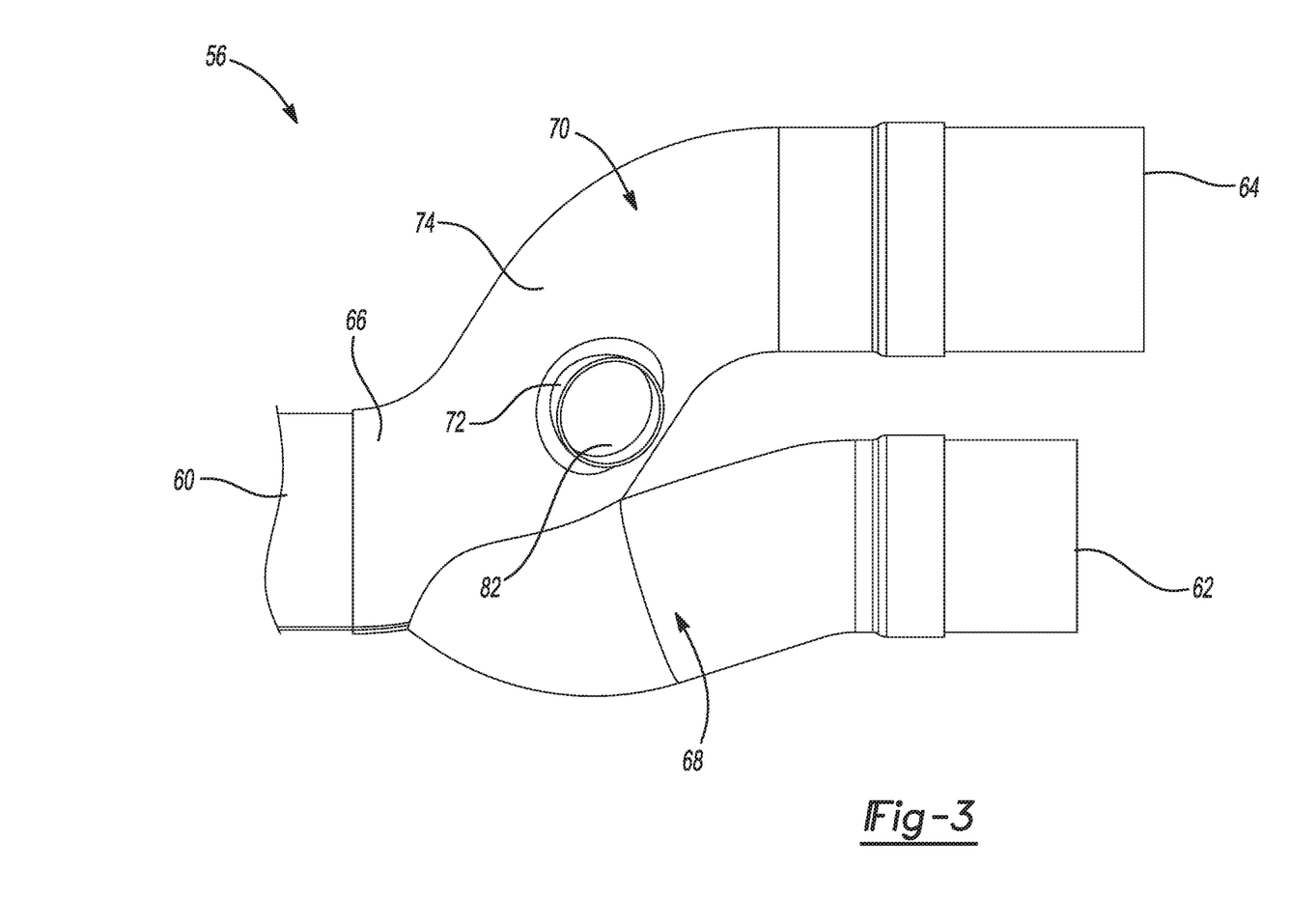
FIG. 3 is a top view of a Y-pipe of one of the satellite mufflers of FIG. 1.

With reference to FIGS. 1-3, an exemplary exhaust assembly 10 for an internal combustion engine (not shown) according to certain aspects of the present disclosure is provided. During operation of the engine, the exhaust assembly 10 may receive exhaust gas discharged from the engine. The exhaust gas may flow from the engine, through a pair of exhaust pipes 12. The exhaust pipes 12 may be directly connected to the engine. In various aspects, the exhaust pipes 12 may be disposed near front wheels of the vehicle. The exhaust assembly 10 may be a dual-exhaust assembly. In various aspects, the pair of exhaust pipes 12 may receive exhaust gas from separate cylinder banks of the engine.

The exhaust assembly 10 may be shaped to fit within a given space available on a vehicle (not shown). For example, the exhaust assembly 10 may be shaped to fit around a space tire well of the vehicle and/or other components at or near an undercarriage of the vehicle. The exhaust assembly 10 may include a first exhaust device 14, and a second exhaust device 16, and a muffler assembly 18. During operation, the first and second exhaust devices 14, 16 may receive exhaust gas from the engine and discharge exhaust gas to the muffler assembly 18. The first and second exhaust devices 14, 16 may be gasoline particulate filters (GPF), diesel particulate filters (DPF), diesel oxidation catalysts (DOC), lean NOx traps (LNT), selective catalytic reduction devices (SCR), or acoustic devices, such as mufflers, by way of example. In one example, the first exhaust device 14 is a first GPF and the second exhaust device 16 is a second GPF.

The muffler assembly 18 may include a first muffler 20, a second muffler 22, and a third muffler 24. In various aspects, the first muffler 20 is referred to as a central muffler and the second and third mufflers 22, 24 are collectively referred to as satellite mufflers. The central muffler 20 and each of the satellite mufflers 22, 24 are packaged separately so that each muffler can be remotely located with respect to the other mufflers. Therefore, the each of the mufflers 20, 22, 24 can be arranged around on the vehicle as needed to accommodate other components and meet packaging requirements. In an alternative aspect, the muffler assembly may include a central muffler, a single satellite muffler, and another satellite exhaust device.

The central muffler 20 may include a first housing 26 having a first shell 28 and a pair of first end caps 30. The first end caps 30 may be sealingly coupled to the first shell 28. The first shell 28 may have an oval-shaped cross section substantially perpendicular to a longitudinal axis of the first shell 28. The first housing 26 may define a first cavity 31. The first cavity 31 may be open and free of baffles or sub-cavities. In various alternative aspects, the first housing 26 may be a different type of housing, such as a clam-formed shell.

The central muffler 20 may also include an X-pipe 32 that is at least partially disposed within the first cavity 31. The first end caps 30 may include a plurality of apertures 34 (i.e., four apertures) through which the X-pipe 32 extends. The X-pipe 32 may be sealingly coupled to the first housing 26 at the first end caps 30.

The X-pipe 32 may include a first inlet 36, a second inlet 38, a first outlet 40, and a second outlet 42 (FIG. 2A). Each of the first and second inlets 36, 38 and the first and second outlets 40, 42 may be fluidly connected to one another. In other embodiments, the first muffler 20 may include alternative pipe configurations that have two inlets and two outlets that are all fluidly connected to one another. For example, the first muffler 20 can include an H-pipe (not shown).

The X-pipe 32 may also include a junction 44 having an aperture 46 (FIG. 2A). The aperture 46 may be open to and in direct fluid communication with the first cavity 31. The aperture 46 may function as a Helmholtz resonator. More particularly, as exhaust gas flows from the first and second inlets 36, 38 to the first and second outlets 40, 42 through the junction 44 during operation of the engine, sound waves may travel through the aperture 46 and into the first cavity 31, thereby reducing noise. Except for the aperture 46, the X-pipe 32 may be imperforate.

The second muffler 22 may include a second housing 48. The second housing 48 may not share any walls with the first housing 26. The second housing 48 may have a second shell 50 and a pair of second end caps 52. The second end caps 52 may be sealingly coupled to the second shell 50. The second shell 50 may have an oval-shaped cross section substantially perpendicular to a longitudinal axis of the second shell 50. The second housing 48 may define a second cavity 54. The second cavity 54 may be open and free of baffles or sub-cavities. In various alternative aspects, the second housing 48 may be a different type of housing, such as a clam-formed shell.

The second muffler 22 may also include a first Y-pipe 56 that is at least partially disposed within the second cavity 54. The second end caps 52 may include a plurality of apertures 58 (i.e., three apertures) through which the first Y-pipe 56 extends. The first Y-pipe 56 may be sealingly coupled to the second housing 48 at the second end caps 52.

As best shown in FIG. 3, the first Y-pipe 56 may include a third inlet 60, a third outlet 62, and a fourth outlet 64. The third inlet 60 and the third and fourth outlets 62, 64 may be fluidly connected to one another. In other embodiments, the second muffler may include alternative pipe configurations that have one inlet and two outlets that are fluidly connected to one another. For example, the second muffler 22 can include a T-pipe or a V-pipe (not shown).

During operation, the third inlet 60 of the first Y-pipe 56 may receive exhaust gas from the first outlet 40 of the X-pipe 32. The exhaust gas may flow through a junction 66 in the first Y-pipe 56 and then be split into first and second streams. The first stream may flow through a first pipe portion 68 and then the third outlet 62. The second stream may flow through a second pipe portion 70 and then the fourth outlet 64. The first and second pipe portions 68, 70 may define first and second lengths, respectively. The second length may be greater than the first length.

The first Y-pipe 56 may further include a first neck 72 extending outwardly from a first main body 74 of the first Y-pipe 56. More particularly, the first neck 72 may extend from the second pipe portion 70. The neck 72 may include a first opening 82 (FIG. 1). The first opening 82 may be open to and in direct fluid communication with the second cavity 54. The first neck 72 with the first opening 82 may function as a Helmholtz resonator. Therefore, during operation of the engine, soundwaves may travel through the neck 72 and into the second cavity 54 to reduce noise when exhaust gas flows through the first Y-pipe 56. Except from the first opening 82, the first Y-pipe 56 may be imperforate.

The third muffler 24 may be similar to the second muffler 22. Thus, the third muffler 24 may include a third housing 84 defining a third cavity 86. The third housing 84 may not share any walls with the first housing 26 or the second housing 48. The third cavity 86 may be open and free of baffles or sub-cavities. In various alternative aspects, the third housing 84 may be a different type of housing, such as a clam-formed shell.

The third muffler 24 may further include a second Y-pipe 88 that is at least partially disposed within the third cavity 86. The second Y-pipe 88 may include a fourth inlet 90, a fifth outlet 92, and a sixth outlet 94. The fourth inlet 90 and fifth and sixth outlets 92, 94 may be fluidly connected to one another.

The fourth inlet 90 of the second Y-pipe 88 may receive exhaust gas from the second outlet 42 of the X-pipe 32 during operation of the engine. The exhaust gas may flow through a junction 96 of the second Y-pipe 88 and into third and fourth pipe portions 98, 100. The second Y-pipe 88 may further include a second neck 102 extending outwardly from a second main body 104 of the second Y-pipe 88. More particularly, the second neck 102 may extend from the fourth pipe portion 100. The second neck 102 may include a second opening 106 that is open to and in direct fluid communication with the third cavity 86 to function as a Helmholtz resonator as described above.

In various alternative aspects, the second and third muffler 22, 24 each include a single inlet and a single outlet so that the exhaust assembly 10 includes two total outlets. For example, the first and second Y-pipes 56, 88 may be replaced with single-inlet/single-outlet pipes, each having the Helmholtz resonator. Where each of the second and third muffler 22, 24 includes a single outlet, the second muffler 22 includes a third outlet and the third muffler includes a fourth outlet. In yet other alternative aspects, one of the second and third muffler 22, 24 includes a single inlet and a single outlet and the other of the second and third muffler 22, 24 includes a single inlet and two outlets so that the exhaust assembly 10 includes three total outlets.

The muffler assembly 18 may include a plurality of additional pipes to fluidly connect the central muffler 20 to the satellite mufflers 22, 24, and to discharge exhaust gas from the satellite mufflers 22, 24. The muffler assembly 18 may include a first intermediate pipe 108 that extends between the first muffler 20 and the second muffler 22 and a second intermediate pipe 110 that extends between the first muffler 20 and the third muffler 24. The first intermediate pipe 108 may fluidly connect the first outlet 40 and the third inlet 60. The second intermediate pipe 110 may fluidly connect the second outlet 42 and the fourth inlet 90. Each of the first and second intermediate pipes 108, 110 may be straight (i.e., extend linearly) and have a substantially circular cross section.

The first and second intermediate pipes 108, 110 may be sealingly coupled to the X-pipe 32 at a location outside of the first housing 26. Similarly, the first and second intermediate pipes 108, 110 may be sealingly coupled to respective first and second Y-pipes 56, 88 at locations outside of the respective second and third housings 48, 84. The first and second intermediate pipes 108, 110 may be at least partially disposed outside of the first, second, and third housings 26, 48, 84. In various aspects, the first and second intermediate pipes 108, 110 may be fully disposed outside of the first, second, and third housings 26, 48, 84. However, in alternative aspects, the X-pipe 32 and first and second Y-pipes 56, 88 may be fully disposed within the respective cavities 31, 54, 86, the first and second intermediate pipes may extend into the cavities 31, 54, 86.

The muffler assembly 18 may include four outlets where exhaust gas is discharged from the vehicle. Thus, the muffler assembly 18 may include a first exhaust outlet pipe 120, a second exhaust outlet pipe 122, a third exhaust outlet pipe 124, and a fourth exhaust outlet pipe 125. The first exhaust outlet pipe 125 may be sealingly coupled to the first portion 68 of the first Y-pipe 56. The second exhaust outlet pipe 122 may be sealingly coupled to the second portion 70 of the first Y-pipe 56. The third exhaust outlet pipe 124 may be sealingly coupled to the third pipe portion 98 of the second Y-pipe 88. The fourth exhaust outlet pipe 125 may be sealingly coupled to the fourth pipe portion 100 of the second Y-pipe 88. The second and fourth exhaust outlet pipes 122, 125 may be longer than the first and third exhaust outlet pipes 120, 124.

The exhaust system 10 may further include first and second E-valves 126, 127 disposed downstream of the respective first and second Y-pipes 56, 88. The first E-valve 126 may be disposed on the second exhaust outlet pipe 122. The second E-valve 127 may be disposed on the fourth exhaust outlet pipe 125. The first and second E-valves 126, 127 may alternatively be disposed on the first and third exhaust pipe portions 120, 124, respectively. The first, second, third, and fourth exhaust outlet pipes 120, 122, 124, 125 include respective seventh, eighth, ninth, and tenth outlets 128, 130, 132, 134.

The exhaust assembly 10 may further include a first muffler inlet pipe 138 and a second muffler inlet pipe 140. The first muffler inlet pipe 138 may fluidly connect the first exhaust device 14 with the central muffler 20, and more particularly the first inlet 36 of the X-pipe 32. The second muffler inlet pipe 140 may fluidly connect the second exhaust device 16 with central muffler 20, and more particularly with the second inlet 38 of the X-pipe 32. Each of the first and second muffler inlet pipes 138, 140 may include one or more curves to depending on the respective positions of the central muffler 20 and the first and second exhaust devices 14, 16.

Figure 4:
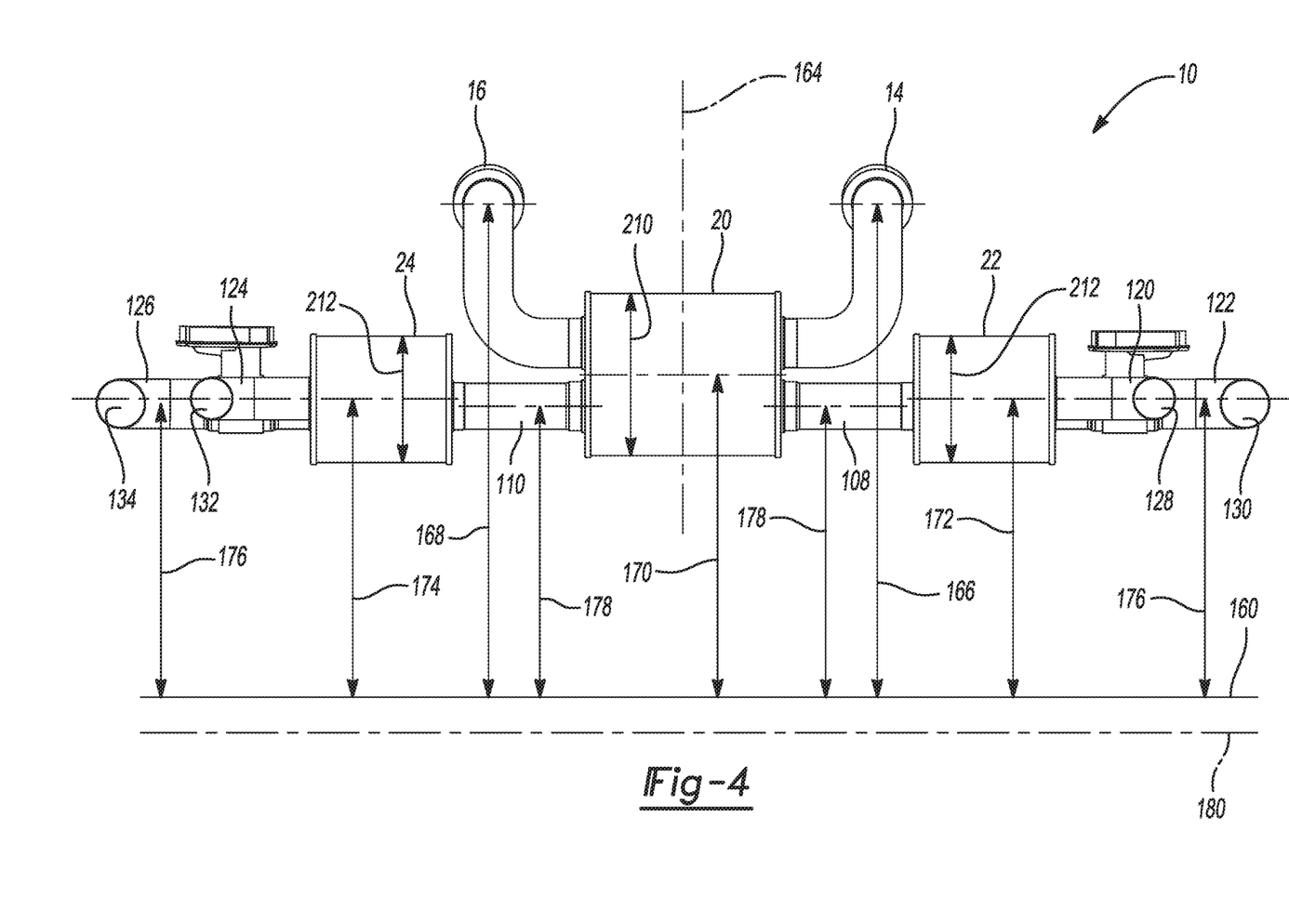
FIG. 4 is a back view of the exhaust assembly of FIG. 1.
Figure 5:
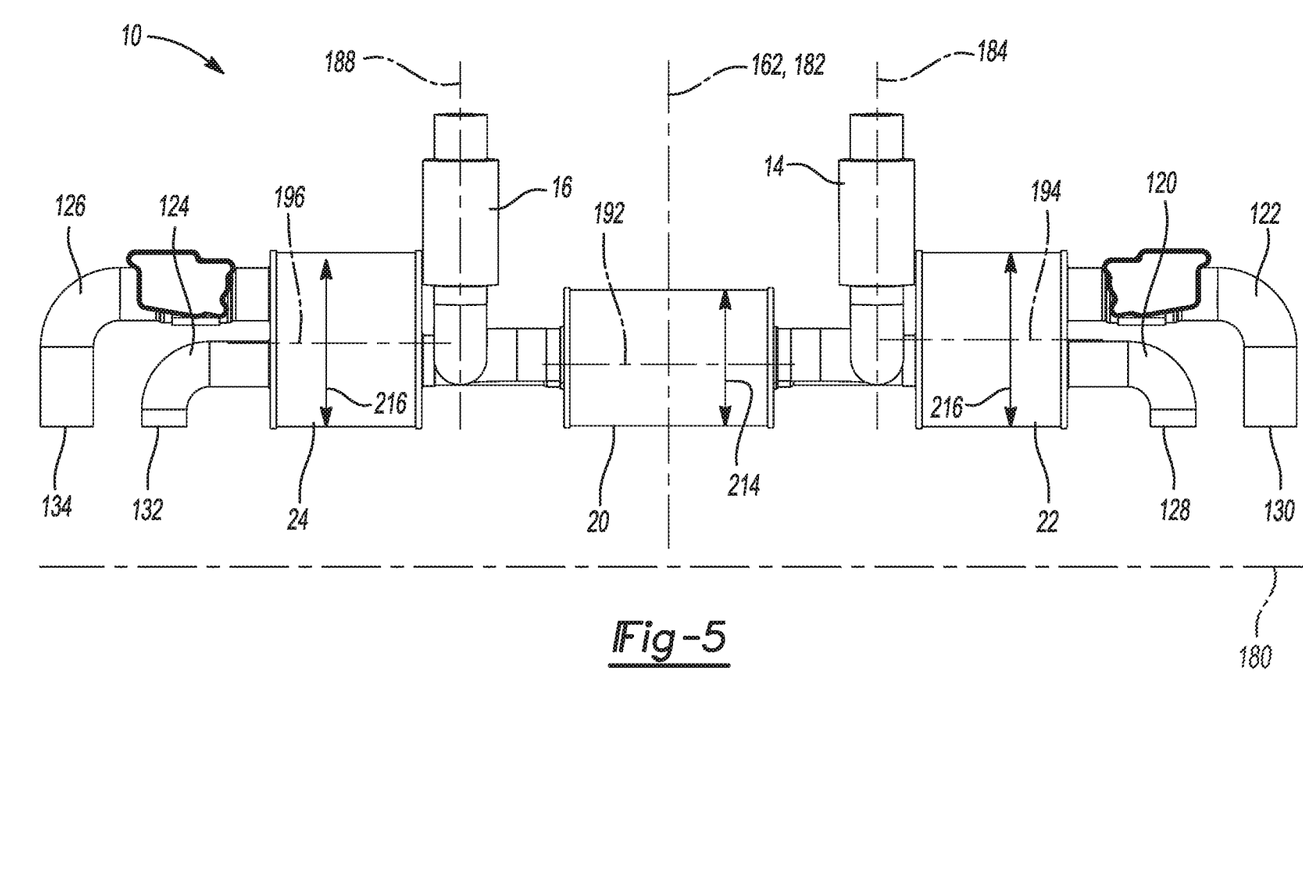
FIG. 5 is a top view of the exhaust assembly of FIG. 1.

Referring to FIGS. 4-5, the exhaust assembly 10 may be included on a vehicle (not shown) that is adapted to travel along a surface 160. The vehicle may include a longitudinal axis 162 (FIG. 5). The longitudinal axis 162 may extend between a front of the vehicle and a rear of the vehicle. The packaging of the exhaust assembly components (i.e., the first and second exhaust devices 14, 16, the central muffler 20, and the satellite mufflers 22, 24) in multiple distinct housings allows the components to be spaced to accommodate various other vehicle components.

FIG. 4 shows a rear view of the exhaust assembly 10 as it could be oriented on a vehicle. The components 14, 16, 20, 22, 24 may be disposed at two or more different heights with respect to the surface 160. As used herein, the term "height" refers to a position along a vertical axis 164 that extends perpendicular to the surface 160. The first exhaust device 14 may be disposed at a first height 166, the second exhaust device 16 may be disposed at a second height 168, the first muffler 20 may be disposed at a third height 170, the second muffler 22 may be disposed at a fourth height 172, and the third muffler 24 may be disposed at a fifth height 174. Each height 166, 168, 170, 172, 174 may refer to a distance between the surface 160 and a vertical center of the respective component 14, 16, 20, 22, 24.

The first and second exhaust devices 14, 16 may be disposed higher than the first, second and third mufflers 20, 22, 24. Therefore, the first and second heights 166, 168 may each be greater than the third, fourth, and fifth heights 170, 172, 174. The central muffler 20 may be disposed higher than the satellite mufflers 22, 24. Therefore, the third height 170 may be greater than the fourth and fifth heights 172, 174. The fourth and fifth heights 172, 174 may be substantially equal so that the second and third mufflers 22, 24 are disposed at the same vertical position. However, in alternative embodiments, the fourth and fifth heights 172, 174 are not equal.

The seventh, eighth, ninth, and tenth outlets 128, 130, 132, 134 of the first, second, third, and fourth exhaust outlet pipes 120, 122, 124, 125, respectively, may all be disposed at a sixth height 176. Thus, each of the exhaust outlet pipes 120, 122, 124, 125 may be disposed at the same distance from the surface 160. The sixth height 176 may be the same as the fourth and fifth heights 172, 174. The first and second intermediate pipes 108, 110 may each be disposed at a seventh height 178. The first and second intermediate pipes 108, 110 may extend substantially parallel to one another and to the surface 160.

Referring to FIG. 5, a top view of the exhaust assembly 10, as it would be oriented on a vehicle, is shown. The components 14, 16, 20, 22, 24 may be disposed at different lateral positions. As used herein, the term "lateral" refers to a side-to-side position with respect to the vehicle (e.g., a position along a transverse axis 180 that extends perpendicular to the longitudinal axis 162 and the vertical axis 164). The first muffler 20 may be laterally centered with respect to the vehicle. Thus, the longitudinal axis 162 may extend through the first muffler 20.

The first and second exhaust devices 14, 16 may each be disposed outboard of the central muffler 20 (i.e., lateral centers of the first and second exhaust devices 14, 16 are disposed outboard of a lateral center of the first muffler 20). The first and second exhaust devices 14, 16 may be disposed on opposite sides of the first muffler 20 (i.e., on opposite sides of the longitudinal axis 162). A position of the second exhaust device 16 may be a mirror image of a position of the first exhaust device 14 about a longitudinal plane 182 that extends perpendicular to the surface 160 and along the longitudinal axis 162. The first and second exhaust devices 14, 16 may therefore be disposed equidistant from the first muffler 20. Because the first muffler 20 is laterally centered, the first and second exhaust devices 14, 16 may also be disposed equidistant from the longitudinal plane 182. In various alternative aspects, however, the first muffler 20 may be disposed laterally off center and/or laterally closer to one of the second muffler 22 and the third muffler 24.

The second and third mufflers 22, 24 may be disposed laterally outboard of the first muffler 20 (i.e., lateral centers of the second and third mufflers 22, 24 may be disposed outboard of the lateral center of the first muffler 20). The second and third mufflers 22, 24 may be disposed on opposite sides of the first muffler 20. A position of the second muffler 22 may be a mirror image of a position of the third muffler 24 about the longitudinal plane 182 so that the second and third mufflers 22, 24 are disposed laterally equidistant from the first muffler 20.

The second and third mufflers 22, 24 may also be disposed laterally outboard of the first and second exhaust devices 14, 16. Thus, the first exhaust device 14 may be disposed laterally between the first muffler 20 and the second muffler 22. The second exhaust device 16 may be disposed laterally between the first muffler 20 and the third muffler 24.

The first exhaust device 14 may extend along a first center axis 184. The second exhaust device 16 may extend along a second center axis 188. The first and second axes 184, 188 may extend substantially parallel to the longitudinal axis 162 of the vehicle.

At least a portion of the second exhaust outlet pipe 122 may be disposed outboard of the first exhaust outlet pipe 120. Similarly, at least a portion of the fourth exhaust outlet pipe 125 may be disposed outboard of the third exhaust outlet pipe 124.

The components 14, 16, 20, 22, 24 may also be disposed at different longitudinal positions (i.e., at different locations along the longitudinal axis 162 of the vehicle). The first and second exhaust devices 14, 16 may each be disposed forward of (i.e., closer to a front of the vehicle) the first muffler 20, and more particularly, of a third center axis 192 of the first muffler 20. The second and third mufflers 22, 24 may be disposed forward of the first muffler 20 (i.e., fourth and fifth center axes 194, 196 of the second and third mufflers 22, 24, respectively, may be disposed forward of the third center axis 192 of the first muffler 20). However, in various alternative aspects, the first, second, and third mufflers 20, 22, 24 may be disposed at the same longitudinal position. The third, fourth, and fifth center axes 192, 194, 196 may each extend parallel to the transverse axis 180.

The seventh and ninth outlets 128, 132 of the first and third exhaust outlet pipes 120, 124 may be disposed rearward of the eighth and tenth 130, 134 outlets of the second and fourth exhaust outlet pipes 122, 125, respectively. The seventh and ninth outlets 128, 132 may be disposed at substantially the same longitudinal position. The eighth and tenth outlets 130, 134 may be disposed at substantially the same longitudinal position. The seventh, eighth, ninth, and tenth outlets 128, 130, 132, 134 may each be oriented toward the rear of the vehicle so that exhaust is expelled from the rear of the vehicle and away from the vehicle.

Returning to FIGS. 1-2B, the X-pipe 32 may define a center plane 198 that extends through each of the first and second inlets 36, 38 and the first and second outlets 40, 42. The first and second outlets 40, 42 may be disposed below the first and second inlets 36, 38 (i.e., closer to the surface than the first and second inlets 36, 38). More particularly, the center plane 198 may extend through centers of the first and second inlets 36, 38 and first and second outlets 40, 42. The center plane 198 may extend perpendicular to the longitudinal axis 162 of the vehicle and through the third center axis 192 of the first muffler 20. Thus, the center plane 198 may also extend substantially perpendicular to the surface 160. The aperture 46 forming the Helmholz resonator may open toward the front of the vehicle.

With reference to FIGS. 1 and 3, the second pipe portion 70 of the first Y-pipe 56 may be disposed forward of the first pipe portion 68. The fourth pipe portion 100 of the second Y-pipe 88 may be disposed forward of the third pipe portion 98. The first Y-pipe 56 may be a mirror image of the second Y-pipe 88 about the longitudinal plane 182.

The X-pipe 32 may generally be vertically oriented (i.e., having a height that is greater than a width). The Y-pipes 56, 88 may generally be horizontally oriented (i.e., having a width that is greater than a height). Returning to FIG. 4, the first housing 26 of the first muffler 20 may define a first vertical dimension 210 perpendicular to the surface 160. The second and third housings 48, 84 of the second and third mufflers, respectively, may each define a second vertical dimension 212 perpendicular to the surface 160. With reference to FIG. 5, the first housing 26 of the first muffler 20 may define a first longitudinal dimension 214 parallel to the longitudinal axis 162 of the vehicle. The second and third housings 48, 84 may each define a second longitudinal dimension 216 parallel to the longitudinal axis 162 of the vehicle. The first vertical dimension 210 may be greater than the first longitudinal dimension to accommodate the vertical orientation of the X-pipe 32. The second vertical dimension 212 may be less than the second longitudinal dimension 216 to accommodate the horizontal orientation of the first and second Y-pipes 56, 88.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust assembly for receiving exhaust gas from an engine of a vehicle adapted to travel along a surface, the exhaust assembly comprising:
    a first exhaust device disposed at a first height with respect to the surface, the first exhaust device being adapted to receive exhaust gas from the engine;
    a second exhaust device disposed at a second height with respect to the surface, the second exhaust device being adapted to receive exhaust gas from the engine;
    a first muffler disposed at a third height relative to the surface, the first muffler including a first housing, an X-pipe positioned within the first housing and including a first inlet adapted to receive exhaust gas from at least one of the first and second exhaust devices, a second inlet adapted to receive exhaust gas from at least one of the first and second exhaust devices, a first outlet, and a second outlet, the first and second inlets and the first and second outlets being fluidly connected to one another;
    a second muffler disposed at a fourth height relative to the surface, the second muffler including a second housing, a third inlet adapted to receive exhaust gas from the first outlet, and a third outlet; and
    a third muffler disposed at a fifth height relative to the surface, the third muffler including a third housing, a fourth inlet adapted to receive exhaust gas from the second outlet, and a fourth outlet, wherein the first and second heights are greater than the third, fourth, and fifth heights.

2. The exhaust assembly of claim 1, wherein the first inlet is adapted to receive exhaust gas from the first exhaust device and the second inlet is adapted to receive exhaust gas from the second exhaust device.

3. The exhaust assembly of claim 1, wherein the third height is greater than the fourth and fifth heights.

4. The exhaust assembly of claim 1, wherein the fourth and fifth heights are substantially equal.

5. The exhaust assembly of claim 1, wherein the first muffler is laterally centered with respect to the vehicle.

6. The exhaust assembly of claim 5, wherein the first and second exhaust devices are disposed laterally outboard of the first muffler and on opposing lateral sides of the first muffler.

7. The exhaust assembly of claim 6, wherein the second muffler is disposed laterally between the first exhaust device and the first muffler, and the third muffler is disposed laterally between the second exhaust device and the first muffler.

8. The exhaust assembly of claim 1, wherein the second muffler further includes a fifth outlet fluidly connected to the third inlet and the third outlet, and the third muffler further includes a sixth outlet fluidly connected to the fourth inlet and the fourth outlet.

9. The exhaust assembly of claim 8, further comprising a first exhaust outlet pipe adapted to receive exhaust gas from the third outlet, a second exhaust outlet pipe adapted to receive exhaust gas from the fifth outlet, a third exhaust outlet pipe adapted to receive exhaust gas from the fourth outlet, and a fourth exhaust outlet pipe adapted to receive exhaust gas form the sixth outlet, each of the first, second, third, and fourth exhaust outlet pipes opening toward a rear of the vehicle.

10. The exhaust assembly of claim 9, wherein the first, second, third, and fourth exhaust outlet pipes include respective seventh, eighth, ninth, and tenth outlets that are disposed at a sixth height with respect to the surface.

11. The exhaust assembly of claim 9, wherein one of the first and second exhaust outlet pipes includes a first E-valve and one of the third and fourth exhaust outlet pipes includes a second E-valve.

12. The exhaust assembly of claim 1, wherein the first exhaust device is a first gasoline particulate filter (GPF) and the second exhaust device is a second GPF.

13. The exhaust assembly of claim 1, wherein the first housing has a first dimension perpendicular to the surface and a second dimension parallel to a longitudinal axis of the vehicle, the first dimension being greater than the second dimension.

14. The exhaust assembly of claim 1, wherein each of the second and third housings defines a first dimension perpendicular to the surface and a second dimension parallel to a longitudinal axis of the vehicle, the second dimension being greater than the first dimension.

15. An exhaust assembly for receiving exhaust gas from an engine of a vehicle adapted to travel along a surface, the exhaust assembly comprising:
   a first exhaust device adapted to receive exhaust gas from the engine;
   a second exhaust device adapted to receive exhaust gas from the engine;
   a first muffler including an X-pipe having a first inlet adapted to receive exhaust gas from the first exhaust device, a second inlet adapted to receive exhaust gas from the second exhaust device, a first outlet, and a second outlet, the first and second inlets and the first and second outlets being fluidly connected to one another;
   a second muffler including a second housing, a third inlet in direct receipt of exhaust gas from the first outlet, and a third outlet; and
   a third muffler including a third housing, a fourth inlet in direct receipt of exhaust gas from the second outlet, and a fourth outlet, wherein the first and second exhaust devices are disposed laterally outboard of the first muffler and on opposing sides of the first muffler.

16. The exhaust assembly of claim 15, wherein the first muffler is laterally centered with respect to the vehicle.

17. The exhaust assembly of claim 15, wherein the first exhaust device is disposed laterally between the first muffler and the second muffler, and the second exhaust device is disposed laterally between the first muffler and the third muffler.

18. The exhaust assembly of claim 15, wherein the second muffler further includes a fifth outlet fluidly connected to the third inlet and the third outlet, and the third muffler further includes a sixth outlet fluidly connected to the fourth inlet and the fourth outlet.

* * * * *